US006941632B1

United States Patent
Mead et al.

(10) Patent No.: US 6,941,632 B1
(45) Date of Patent: Sep. 13, 2005

(54) CONFORMAL TRANSVERSE HAT PROFILE ROLLER

(75) Inventors: William T. Mead, Long Beach, CA (US); John Potter, Camarillo, CA (US); Narciso Gonzales, Whittier, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 848 days.

(21) Appl. No.: 09/708,899

(22) Filed: Nov. 8, 2000

(51) Int. Cl.[7] ............................................. B23P 17/00
(52) U.S. Cl. ........................ 29/424; 29/81.03; 29/270; 492/7; 492/13; 492/60; 156/349; 156/579
(58) Field of Search ........................ 29/235, 270, 278, 29/424, 464, 81.03; 156/71, 349, 574, 579; 492/7, 13, 15, 16, 60

(56) References Cited

U.S. PATENT DOCUMENTS

| 132,736 | A | | 11/1872 | Pierce | |
|---|---|---|---|---|---|
| 563,044 | A | | 6/1896 | Lewis | |
| 2,246,263 | A | * | 6/1941 | Patterson | .................... 601/129 |
| 2,339,492 | A | * | 1/1944 | Lewis | ........................ 100/336 |
| 3,098,783 | A | * | 7/1963 | Busch et al. | ................ 156/579 |
| 3,127,299 | A | | 3/1964 | Hecht | |
| 3,340,131 | A | * | 9/1967 | Leibow | ...................... 156/579 |
| 3,568,285 | A | | 3/1971 | Lieberg | |
| 3,611,528 | A | * | 10/1971 | Lance | ......................... 156/579 |
| 3,736,199 | A | | 5/1973 | Mason | |
| 4,293,361 | A | * | 10/1981 | Savio et al. | ................. 156/242 |
| 4,314,395 | A | | 2/1982 | Brock | |
| 4,460,433 | A | * | 7/1984 | Boyd | ......................... 156/574 |
| 4,578,851 | A | | 4/1986 | Song | |
| 4,838,986 | A | * | 6/1989 | Rhoades et al. | ............ 156/574 |
| 4,861,400 | A | * | 8/1989 | Sargent | ....................... 156/71 |
| D307,597 | S | | 5/1990 | Levine | |
| 5,069,732 | A | | 12/1991 | Levine | |
| 5,228,944 | A | * | 7/1993 | Seifried et al. | ............. 156/500 |
| 5,410,773 | A | | 5/1995 | Forkner | |
| 5,437,593 | A | | 8/1995 | Gustavsen | |
| 5,439,540 | A | * | 8/1995 | Lippman et al. | .............. 156/71 |
| 5,621,969 | A | | 4/1997 | Masuda | |
| 5,939,006 | A | * | 8/1999 | Wang et al. | ................ 264/258 |
| 6,049,970 | A | * | 4/2000 | Reis et al. | .................... 29/798 |
| 6,089,298 | A | * | 7/2000 | Tutewohl | .................... 156/579 |

* cited by examiner

Primary Examiner—Essama Omgba
(74) Attorney, Agent, or Firm—Stetina Brunda Garred & Brucker (57) ABSTRACT

There is provided a variable pressure roller system for installing a preform having contact surfaces onto a configuration of a mold surface by applying pressure thereon. The roller system of the present invention comprises a roller carriage. A grasping handle may be mounted to the roller carriage. Moreover, the roller system may further comprise a plurality of rollers, wherein each respective one of the plurality of rollers is defined by a weight to generate a specific pressure corresponding thereto. Furthermore, each respective one of the plurality of rollers may be removably engageable to the roller carriage. Each respective one of the plurality of rollers may be adapted to uniformly distribute the specific pressure corresponding thereto on the contact surfaces for conforming the preform to the configuration of the mold surface when engaged to the roller carriage.

42 Claims, 4 Drawing Sheets

CONFORMAL TRANSVERSE HAT PROFILE ROLLER

CROSS-REFERENCE TO RELATED APPLICATIONS (Not Applicable)

STATEMENTS RE: FEDERALLY SPONSORED RESEARCH/DEVELOPMENT (Not Applicable)

BACKGROUND OF THE INVENTION

The present invention generally relates to an apparatus and a method for installing a preform onto a mold surface, and more particularly to an improved apparatus and method for installing a preform onto a contoured mold surface via a roller device having a selectable roller skate to apply pressure thereon.

The installation of preforms onto a specified mold surface to form composite materials is well known in commercial and military applications. The resulting composite materials are desirable due to their mechanical characteristics such as a high strength to weight ratio and high thermal tolerances. As such, the preforms and the corresponding mold surfaces are essential initial components in the resulting composite materials that are frequently used to build structural supports, such as ducts for aircrafts.

Because of their advantageous mechanical characteristics, composite parts are proving to be increasingly valuable in serving as structural components in a variety of articles. Generally, in order to manufacture such parts, the preforms are "laid up" over a mold surface and then cured under elevated temperature and pressure. More specifically, because the resulting composite parts are oftentimes used in the aerospace or aircraft industries, the parts must be meticulously detailed as to their structural integrity. To meet these meticulous specification details, precise control of temperature and pressure conditions is required when the preform is cured on the mold surface.

The preforms may primarily be classified into two different types, namely, "prepregs" and "non-prepregs." Prepreg preforms are generally sheets of fiber that have uncured resin embedded therein and are widely utilized for forming structure composite parts. Similar to the above, the prepreg preforms may be laid over the mold surface, and while being-maintained in position against the mold, it is subjected to heat and pressure to cure the prepreg preforms into the composite materials. Various apparatus may be utilized in maintaining the prepreg preforms in contact with the mold surface during the cure thereof such as press platens, vacuum bags or trapped rubber molding systems.

The other types of preforms are non-prepreg preforms. The non-prepreg preforms are generally similar to the prepreg preforms in that they are still laid up on a mold surface. However, unlike the prepreg preforms, the non-prepreg preforms are initially resin free. The lay up is subsequently vacuum bagged, and a vacuum is drawn from between the bag and mold surface such that the lay-up is compressed to atmosphere against the mold surface. However, in this process, resin is simultaneously drawn in through an inlet port in the vacuum bag and through the lay-up impregnating it. Finally, the now impregnated non-prepreg preforms are heated until the resin is cured.

Regardless of using processes that include prepreg preforms or not, one factor remains constant. The fibers, namely, preforms that subsequently form the composite parts, must be laid over the mold surface prior to being subjected to the above-specified processes. More specifically, whether the process involves prepregs or not, the fibers, or the preforms, must be initially laid over the mold and go through similar preparations in order to be ready for the above-specified processes.

The initial preparations needed for the preforms to be subsequently cured frequently involve manual labor. In the industry that values time-efficiency, precision and cost-effectiveness, the current preparations of preforms may oftentimes compromise such objectives.

For example, one such method now used of preparing the preforms is to lay-up individual preforms by hand. Thereafter, the preform may be installed to the mold surface using overhead infrared heat. Such method may result in long cycle times of several days. Furthermore, due to the lengthy cycle time, the profits in a given project that utilizes such method may be reduced from its projected optimal range.

More importantly, however, the lay-up of the preform upon the mold may be inappropriately accomplished because the manual approach of the current method lacks systematic uniformity, and thus compromising the requisite precision at times. Therefore, in the industry where such composite parts are often mass-produced, the inapt preparations just described may prove to have undesired effects upon the overall manufacturing of the composite parts.

Thus, there has long been a need in the industry, and in the aerospace industry in particular, for an apparatus and method for improving the lay-up of the preform upon the mold in a more time-efficient and cost-effective manner. In particular, there is a need to install the preform upon the mold by utilizing a systematic approach to consistently yield the requisite precision that the manual labor is unfit to provide.

The present invention addresses and overcomes the above-described deficiency of prior art lay-up processes by providing an apparatus and method that utilizes a roller device to apply selected pressure on the mold surface having the preform laid thereupon. More specifically, the roller device is sized and configured to engage at least one selected roller skate from a library of roller skates to apply the pressure corresponding thereto on the mold surface. In addition, the selected roller skate is further conformed to move along the contour of the mold so as to facilitate application of the desired pressure. In this respect, not only does the present invention mitigate the need to resort to inefficient and costly preparations, but it also maximizes the consistent precision that is often required in such processes.

BRIEF SUMMARY OF THE INVENTION

In accordance with the present invention, there is provided a variable pressure roller system for installing a preform having contact surfaces onto a configuration of a mold surface by applying pressure thereon. The roller system of the present invention comprises a roller carriage. A grasping handle may be mounted to the roller carriage. Moreover, the roller system may further comprise a plurality of rollers, wherein each respective one of the plurality of rollers is defined by a weight to generate a specific pressure corresponding thereto. Furthermore, each respective one of the plurality of rollers may be removably engageable to the roller carriage. Each respective one of the plurality of rollers may be adapted to uniformly distribute the specific pressure corresponding thereto on the contact surfaces for conforming the preform to the configuration of the mold surface when engaged to the roller carriage.

More specifically, the roller carriage may be fabricated from a metallic material. In addition, the roller carriage may have a first surface, wherein the grasping handle may be mounted thereon. The roller carriage may further have a second surface, wherein each respective one of the plurality of rollers may be rotatably engageable thereto. The second surface may further comprise at least one paired flanges having a respective opening opposed to each other. The at least one paired flanges may extend downward in generally perpendicular relationship to the second surface, wherein each respective one of the plurality of rollers may be positionable between the at least one paired flanges to engage thereto.

In accordance with the present invention, the roller system may further comprise an elongated shaft. In addition, each respective one of the plurality of rollers may have an aperture extending therethrough. In particular, the shaft may be sequentially advanceable through one opening of the at least one paired flanges, the aperture, and other opening of the at least one paired flanges to simultaneously extend thereacross. Such shaft may have shaft ends, wherein the shaft may be securable in position after extending across the one opening, the aperture, and the other opening via a fastener applied to the shaft ends thereof.

Moreover, the plurality of rollers may be fabricated from a metallic material. Additionally, the at least one of the plurality of rollers may be fabricated from aluminum, or steel. The plurality of rollers may comprise a first roller and a second roller each defining a continuous circular roller body having a diameter corresponding thereto. More specifically, the size of the roller body and the diameter corresponding thereto of the first roller may be substantially larger than the size of the roller body and the diameter corresponding thereto of the second roller. The first roller and the second roller may be simultaneously engaged to the roller carriage.

Each respective one of the plurality of rollers may comprise a continuous circular roller body defining a recess circumventing intermediate area thereof. The recess may be defined by a recess width and a recess depth. The mold surface may be a hat mold surface with a pyramidal configuration thereon. The pyramidal configuration may be defined by a pyramidal width, a pyramidal height and a pyramidal length.

More particularly, the recess may be positionable over the pyramidal configuration to allow each respective one of the plurality of rollers to move along the pyramidal length. The recess depth may be sufficient to receive the pyramidal height, whereas the recess width may be sufficient to accommodate the pyramidal width. Specifically, the recess depth may substantially correspond to the pyramidal height and the recess width may substantially align with the pyramidal width.

Furthermore, the contact surfaces may be defined as side portions of the preform, wherein a centerline may further be disposed therebetween. The centerline may have a centerline width. The centerline may be superimposeable upon the pyramidal configuration such that the centerline width substantially aligns with the pyramidal width. The centerline may further substantially align with the recess width when the at least one of the plurality of rollers moves along the pyramidal length. In addition, each of the side portions may have a respective side width. The roller body may be sized to engage the side width of each of the side portions to uniformly distribute the pressure thereon when the at least one of the plurality of rollers moves along the pyramidal length. The at least one of the plurality of rollers may be repeatedly moved on the preform until the installation of the preform onto the mold surface is achieved.

Further, the roller system of the present invention may comprise at least one ply. The at least one ply may be superimposeable upon the preform and further be receivable of the pressure when the at least one of the plurality of rollers moves thereon. There may further comprise a peel ply that may be superimposeable upon the preform. Additionally, there may also be at least one film that is superimposeable upon the peel ply and further be receivable of the pressure when the at least one of the plurality of rollers moves thereon. Lastly, there may be at least one fillet that is superimposeable upon the at least one film, which may be receivable of the pressure when the at least one of the plurality of rollers moves thereon.

BRIEF DESCRIPTION OF THE DRAWINGS

These as well as other features of the present invention, will become more apparent upon reference to the drawings wherein.

DETAILED DESCRIPTION OF THE INVENTION

Figure 1:
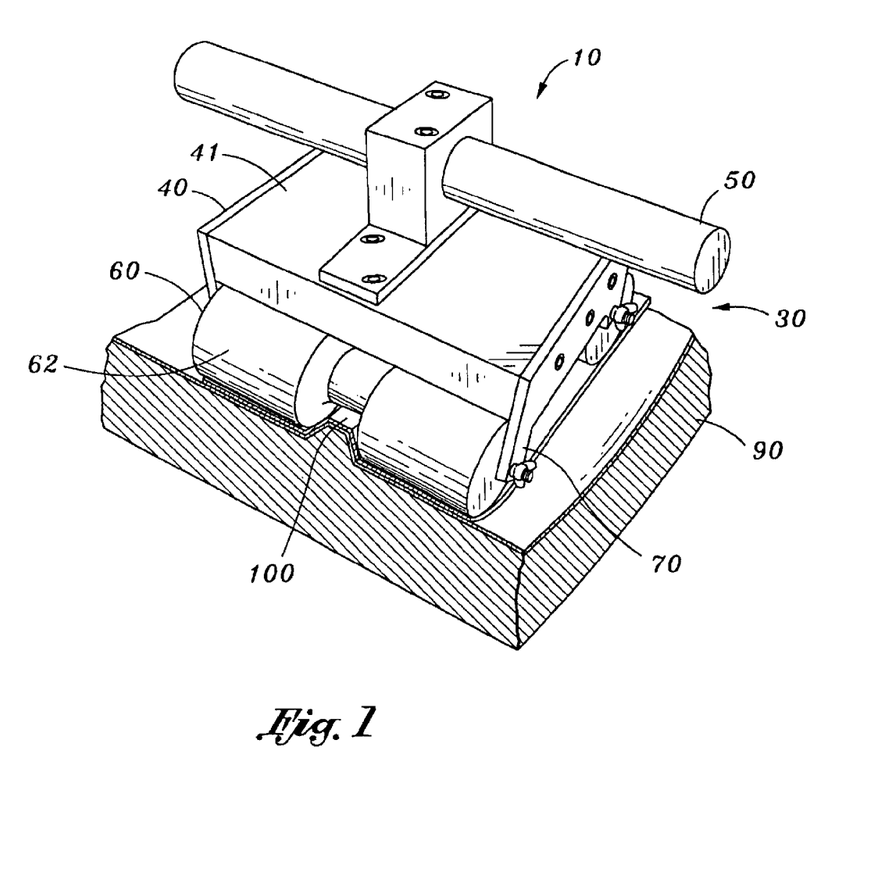
FIG. 1 is a perspective view of a roller system utilized for installing a preform onto a mold surface constructed in accordance with a preferred embodiment of the present invention and including at least one roller engaged thereto.

Referring now to the drawings wherein the showings are for purposes of illustrating preferred embodiments of the present invention only, and not for purposes of limiting the same, FIG. 1 perspectively illustrates a roller system 10 constructed in accordance with a preferred embodiment of the present invention. The roller system 10 is adapted to be utilized for installing a preform 20 onto a mold surface 30 by applying pressure thereon. In this regard, the roller system 10 may be formed to have a variety of shapes, configurations, and geometries to achieve such purpose, namely, applying the pressure on the mold surface 30 having the preform 20 laid thereupon.

Figure 2:
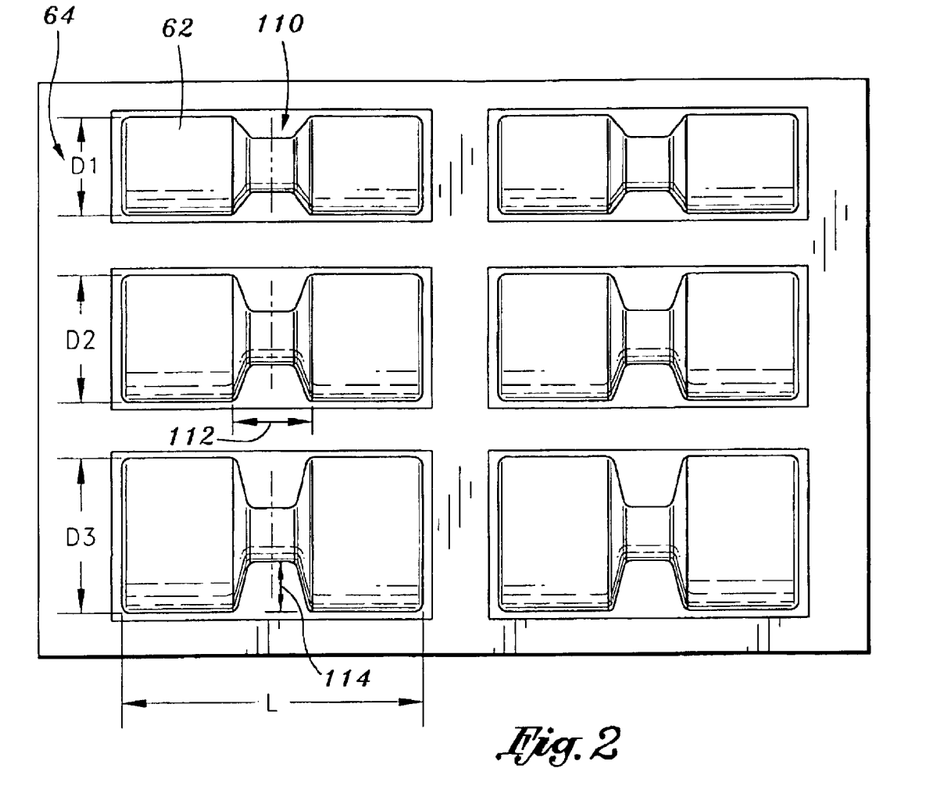
FIG. 2 is a side view of a plurality of rollers each having a differently sized circular roller bodies and diameters corresponding thereto wherein each respective one of the plurality of rollers is removably engageable to the roller system as shown in FIG. 1.

Referring now to FIGS. 1 and 2, as the roller system 10 may be any general shape, it is understood that the roller system 10 as depicted is symbolic in nature, and it is the concept of utilizing such system 10 that should be appreciated. The roller system 10 primarily comprises a roller carriage 40, a grasping handle 50 and at least one roller skate 60.

More specifically, as similarly stated above, the roller carriage 40 may be formed to have a variety of shapes, configurations, geometries and textures. It will be appreciated by those of ordinary skill in the art that the general rectangular shape of the roller carriage 40 illustrated in FIGS. 1 and 2 is just one symbolic depiction among many. It is submitted that any shape that will serve the purpose of the roller carriage 40, as will be described immediately below, will be operative with the present invention. Moreover, the roller carriage 40 may be fabricated from a variety of materials such as metal, plastic, wood, hard rubber, or the like. Therefore, it should be obvious to one of ordinary skill in the art that the weight of the roller carriage 40 may be adjustable to the desire of its user by altering the mass of the roller carriage 40.

As already stated, the roller carriage 40 may be formed to have a general rectangular configuration. The rectangular configuration of the roller carriage 40 may yield planar outer surfaces having a first surface 41 and a second surface 42. Specifically, when the roller carriage 40 is placed upright on a flat plane, the second surface 42 may be in abutting contact with such plane, whereas the first surface 41 may be in general parallel position vertical to the second surface 42.

The first surface 41 may further be defined to have a generally planar characteristics. Furthermore, the first surface 41 may be utilized to attach the grasping handle 50 thereon. The grasping handle 50 may be used primarily to move the roller carriage 40 in a desired direction, namely by pushing or pulling the rolling carriage 40 via the handle 50. It should be contemplated by those of ordinary skill in the art that any type of grasping handle 50, whether conventional or creative, may be attached to the roller carriage 40 to serve this purpose. However, it is recommended that the grasping handle 50 having a configuration of a T-cross section be used so as to facilitate the use of two hands for movement of the roller carriage 40. Moreover, the grasping handle 50 may be mounted on the first surface 41 of the roller carriage 40 by any means such as by screws, rivets, drilling pins, bolts or the like. In addition, the grasping handle may be constructed from any type of materials such as metal, plastic, hard rubber, wood or the like.

The second surface 42 may be utilized to rotatably and removably engage the at least one roller 60. More specifically, the second surface 42 may engage one roller 60 or a plurality of rollers 60 thereunder depending on the desire of its user or the job that needs to be performed. There may comprise a plurality of rollers 60 wherein each respective one of the plurality of rollers 60 is operative to apply a specific pressure corresponding thereto. Each one of the rollers 60, or a pair thereof, may be differentiated from the other rollers 60 by having a circular continuous roller body 62 with a diameter 64 corresponding thereto that is unique to its own. Simply put, each respective one of the rollers 60, or a pair thereof, may be differentiable from other rollers 60 based on the size of its roller body 62, which in turn forms its own corresponding diameter 64. By having different sizes 62 and diameters 64, each respective one of the rollers 60 may be able to produce a specific pressure corresponding thereto in order to form a collection of rollers 60 having the capability to generate a diversity of different pressures.

The plurality of rollers 60 may be fabricated from any material that would serve the purpose that they were designed for, as will be described below. It may be contemplated by those of ordinary skill in the art that the rollers 60 may be formed from materials such as hard rubber, plastic, wood, metal or the like. However, metallic material is recommended.

Alternatively, the plurality of rollers 60 may be similarly sized. More specifically, the plurality of rollers 60 may be defined to have similarly sized circular roller bodies 62 to also yield similarly sized diameters 64 corresponding thereto. However, as stated above, the rollers 60 may be fabricated from metallic material. It may be generally known in the art that different metallic materials may yield different weights. Simply put, some metallic substances may be heavier, or lighter, than the others.

If the rollers 60 are similarly sized, then at least one of the plurality of rollers 60 may be differentiable from others based on weight alone. More particularly, then at least one of the plurality of rollers 60 may be fabricated from a different metallic material than the others. For instance, the at least one of the plurality of rollers 60 may be fabricated from aluminum, which is believed to be characterized as being a light metal, while the other rollers 60 are composed of different types of metals. When the at least one of the plurality of rollers 60 is fabricated from aluminum, it is recommended that such roller 60 be configured to weigh in the range of two to five pounds. Or in the alternative, the at least one of the plurality of rollers 60 may be fabricated from stainless steel, which may be usually described as being a heavy metal. In this scenario, it is recommended that such roller 60 be manufactured to weigh in the range of 9–14 pounds.

Figure 3:
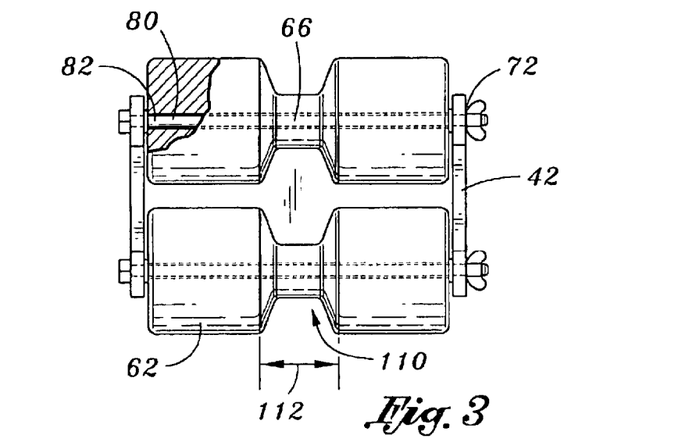
FIG. 3 is a bottom view of the at least one roller defining a recess circumventing-intermediate area thereof as shown in FIG. 1.

Referring now to FIGS. 1–3, each respective one of the plurality of rollers 60 may be rotatably and removably attached to the second surface 42 of the roller carriage 40. More specifically, the second surface 42 may have at least one paired flanges 70 extending therefrom for engaging the at least one of the plurality of rollers 60. Moreover, each of the at least one paired flanges 70 may further have a respective opening 72. One of the paired flanges 70 may extend downward from a corner of the periphery of the second surface 42, as the other of the paired flanges 70 may also extend downward from a different corner of the periphery thereof. By doing so, the at least one paired flanges 70 may be positioned in a way that it forms a generally perpendicular relationship to the second surface 42. It is recommended that the paired flanges 70 linearly oppose each other, rather than being diagonally opposed to each other. In this respect, the at least one of the plurality of rollers 60 may be engaged between the paired flanges 70. Moreover, a second paired flanges 70 may also extend from the second surface 42 as described above to engage another of the roller skates 60 therebetween.

It may be contemplated by those of ordinary skill in the art that the at least one of the plurality of rollers 60 may be engaged between the at least one paired flanges 70 by any conventional means. For example, each respective one of the plurality of rollers 60 may have an aperture 66 running across the length of the roller body 62 in order to receive an elongated shaft 80 therethrough. The elongated shaft 80 may further extend through one of the opening 72 of the at least one paired flanges 70, and then through the aperture 66 of the roller body 62, to thereby protrude out of the other opening 72 of the at least one paired flanges 70.

The elongated shaft 80 may be labeled by shaft ends 82 which may be fastened to secure the shaft 80 in position. The shaft ends 82 of the elongated shaft 80 may be fastened via any type of fastener such as a nut and a bolt, vise, wingnut or the like. In the alternative, the elongated shaft 80 may partially extend through the aperture 66 of the roller body 62, originating from both of the paired flanges 70. Therefore, the at least one of the plurality of rollers 60 may attach to the roller carriage 40 via the elongated shaft 80 and rotatably move with respect thereto.

Moreover, the at least one of the plurality of rollers 60 may further be snapped between the at least one paired flanges 70. For instance, the elongated shaft 80 may only extend partially through the aperture 66 of the roller body 62. The elongated shaft 80 may only partially extend such that the at least one of the plurality of rollers 60 may easily be detached by angularly twisting or adjusting it in relation to the shaft 80. Or, in the alternative, the fastening system on the paired flanges 70, whether via the nut and bolt, vise, wingnut or the like, may simply be unfastened. By doing so, the user may select any of each respective one of the plurality of rollers 60 to be utilized with the roller system 10. Thus, the user has access to the diversity of pressures at his or her own choosing.

Referring now to FIGS. 4–7, the mold surface 30 is adapted to receive the preform 20 thereupon to form a composite part. In this regard, the mold surface 30 may be formed to have a variety of shapes, configurations, geometries and textures in accordance with the desired shape of the composite part formed therefrom. Such mold surface 30 may be fabricated from any material such as metal, plastic, wood or the like.

Figure 4:
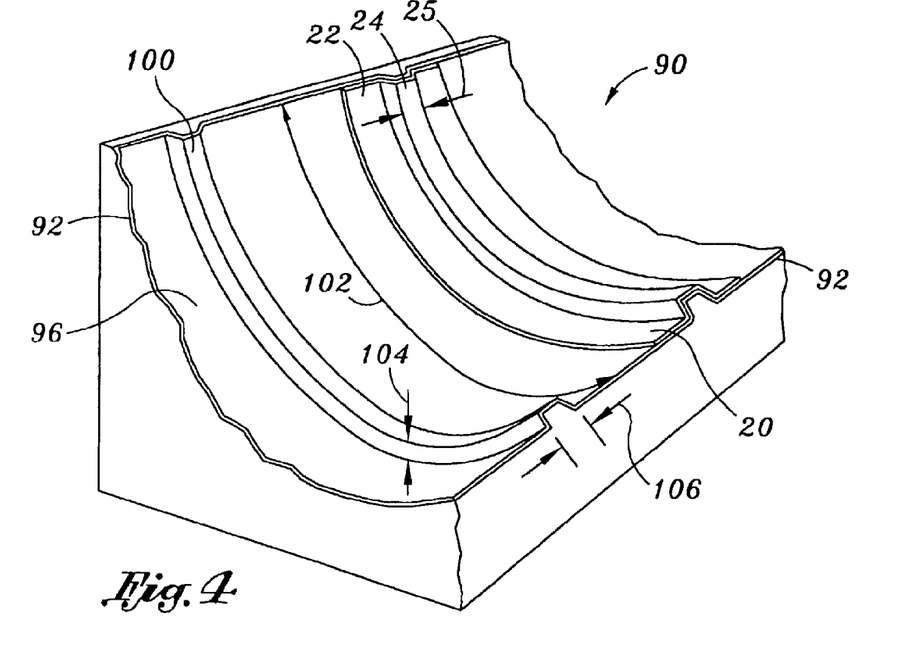
FIG. 4 is a perspective view of a hat mold surface with a preform laid thereupon and further comprising pyramidal configurations as shown in FIG. 1.
Figure 5:
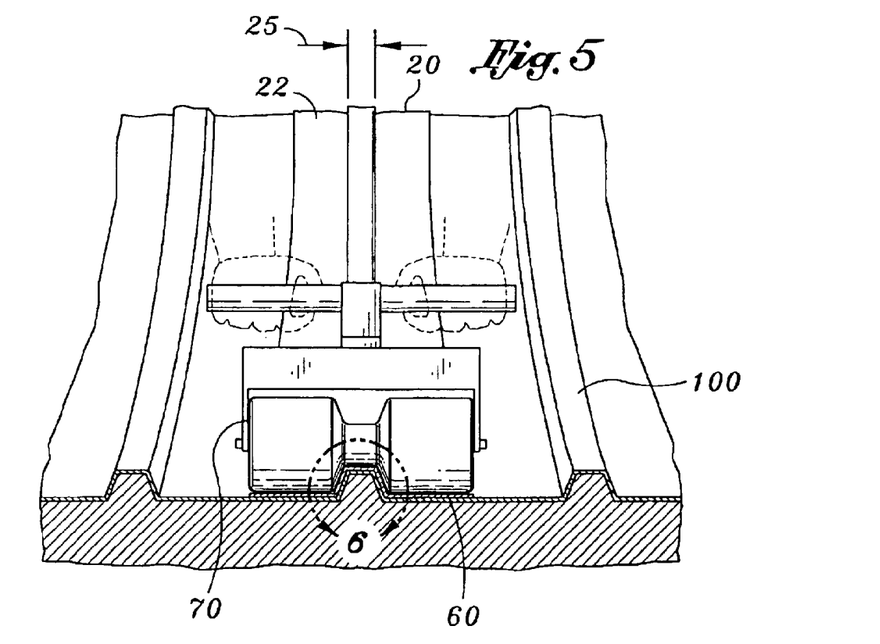
FIG. 5 is a front view of the roller system applying pressure on the preform for installation onto the hat mold surface of FIG. 4.
Figure 6:
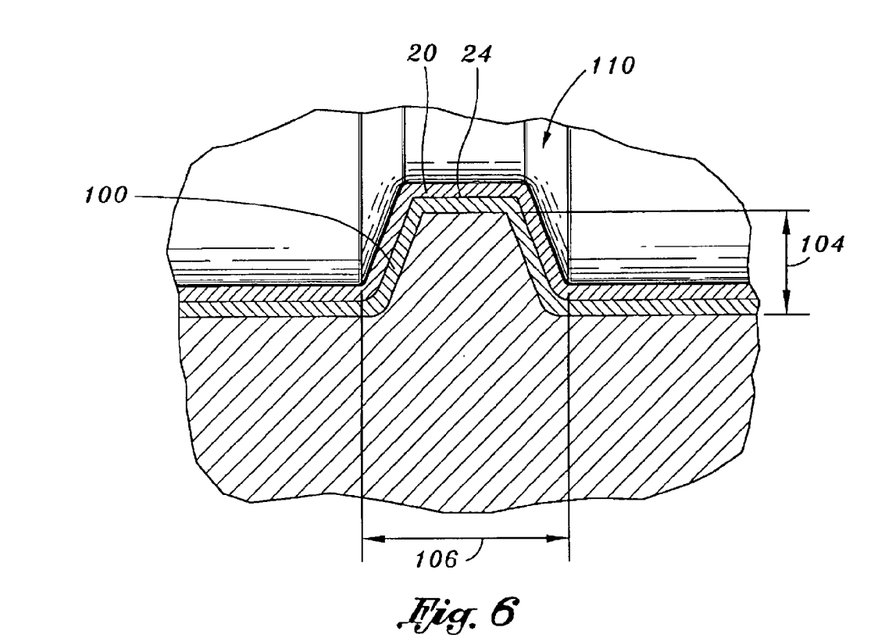
FIG. 6 is a cross-sectional view of the relationship between the recess of FIG. 3 and the pyramidal configuration of FIG. 4 when the roller system moves along the hat mold surface having the preform laid thereupon.

As the mold surface 30 may be any general desired shape, it is understood that the mold surface 30 as depicted is symbolic in nature. However, the mold surface 30 is depicted as being a hat mold surface 90. The hat mold surface 90 may defined by edges 92 surrounding the periphery thereof. More specifically, each of the edges 92 are perpendicularly adjoined to each other, simultaneously being in a parallel relationship to its opposing counterpart.

The hat mold surface 90 includes at least one pyramidal configuration 100 thereon. In particular, the at least one pyramidal configuration 100 may be defined by a pyramidal length 102, a pyramidal height 104, and a pyramidal width 106. The length 102 of the pyramidal configuration 100 may extend across the hat mold surface 90, whereas the pyramidal width 106 thereof may be defined to partially extend on the hat mold surface 90 in the perpendicular direction to the pyramidal length 102. More specifically, the pyramidal configuration 100 may linearly extend from one of the edges 92 of the hat mold surface 90 to an opposing edge 92 thereof. The pyramidal configuration 100 may be characterized by upwardly slanted sides intersecting with a plane top thereon, thus forming a pyramidal height 104 that is vertical from the hat mold surface 90. Additionally, the pyramidal configuration 100 may further comprise placement caps surrounding the ends thereof. Moreover, the hat mold surface 90 may only have one pyramidal configuration 100 thereon, or in the alternative, have a plurality of pyramidal configurations 100 arranged in rows running thereacross. Furthermore, the hat mold surface 90 may further define mold lines 94. The mold lines 94 are generally parallel to the upwardly slanted sides of the pyramidal configuration 100.

In addition, the hat mold surface 90 may further comprise excess trims 96. The excess trims 96 may be placed adjacent to the mold lines 94. In fact, the excess trims 96 may extend from the mold lines 94 to the end of the hat mold surface 90. For clarification purposes, even though the excess trims 96 are defined to be part of the hat mold surface 90, the excess trims 96 are usually not utilized to engage the preform 20 on the hat mold surface 90.

Moreover, in order to make the composite part, the preform 20 may be formed to have a peripheral geometry similarly sized and configured as a configuration of the hat mold surface 90. More specifically, the preform 20 may be cut utilizing a template to conform to the configuration of the hat mold surface 90. The template having the peripheral geometry as that of the hat mold surface 90 may be placed upon the preform 20. Then, the manufacturers may cut the preform 20 using a sharp object, such as a knife or the like, in concordance with the periphery of the template.

In particular, the preform 20 may have side portions 22. In addition, the preform 20 may further have a centerline 24 that is disposed between the side portions 22 of the preform 20. The centerline 24 may be defined by a centerline width 25. Moreover, in order for the preform 20 to conform to the hat mold surface 90, the centerline 24 of the preform 20 may be cut according to the pyramidal configuration 100 of the hat mold surface 90. It is preferable, but does not have to be, for the centerline 24 of the preform 20 to be cut within three degrees of normal to the pyramidal configuration 100 of the hat mold surface 90. Moreover, the side portions 22 of the preform 20 may further be cut, but does not have to be, such that the side portions 22 are extendable up to the mold lines 94 of the hat mold surface 90. However, care must be taken when cutting the preform 20 as the quality of peripheral geometry of the composite part resulting therefrom depends on the caliber of the cut. In the alternative, a preform 20 that is unprepared may simply be laid on the hat mold surface 90.

More particularly, after the preform 20 has been prepared according to the above, the preform 20 may be laid wherein the centerline 24 thereof may somewhat fittingly engage the pyramidal configuration 100 of the hat mold surface 90. More specifically, the centerline 24 of the preform may be laid upon pyramidal configuration 100 such that the centerline width 25 substantially aligns with the pyramidal width 106. Furthermore, as will be fully described below, the centerline width 25 may further substantially align with a recess width 112 of a recess 110 formed around intermediate area of each respective one of the plurality of rollers 60 when the pressure is applied thereto. However, one of ordinary skill in the art would realize that such lay-up is not necessary in the sense that the preform 20 could simply be placed on the pyramidal configuration 100, in which the roller system 10 may apply pressure thereon to form a centerline 24 thereby.

In addition, the contact surfaces of the preform 20, or side portions 22, may be defined as the portions that further extend from the ends of the pyramidal width 106 after the centerline 22 is positioned as stated above. After such lay-up of the preform 20 has been accomplished, the roller system 10 may be utilized to install the preform 20 onto the hat mold surface 90 by applying pressure thereon, preferably the entirety thereof. As stated above, selective pressure may be achieved by attaching the desired one of the roller skates 60, or a plurality thereof.

As it will be appreciated by those of ordinary skill in the art, the roller system 10 may be adapted to be operable in a variety of mold surfaces 30, and should not be limited solely to the hat mold surface 90. Conformity to the hat mold surface 90 is symbolic in nature, and it is the concept of such use that should be recognized. The roller system 10 may apply pressure for installation purposes via the rollers 60. As the preform 20 is laid upon the hat mold surface 90, the recess 110 of the rollers 60 may be positioned over the width 106 of the pyramidal configuration 100. More specifically, each respective one of the plurality of rollers 60 may comprise a continuous circular roller body 62, as mentioned above. Such roller body 62 may define the recess 110 in the intermediate area thereof. The recess 110 may be described as circumventing such intermediate area, or simply being formed all around the intermediate area of the roller body 62.

The recess 110 may be defined by the recess width 112. The recess 110 may further be defined by a recess depth 114. The recess 110 of each respective one of the plurality of rollers 60 may be adapted to movably position over the pyramidal configuration 100 having the preform 20 laid thereon. More specifically, the recess depth 114 may be sized to adequately receive the pyramidal height 104 therein, wherein the recess depth 114 may substantially correspond to the pyramidal height 104. Furthermore, the recess width 112 may be sized to sufficiently accommodate the pyramidal width 106, wherein the recess width 106 may substantially align with the pyramidal width 106. By doing so, each respective one of the plurality of rollers 60 may move along the hat mold surface 90, namely, along the pyramidal length 102. It may be recognized by those of ordinary skill in the art that in an industry where mass-production is valued, the mold surface 30, such as the hat mold surface 90, are usually manufactured to be used over long durations. Therefore, conforming the recess 110 of each respective one of the plurality of rollers 60 may be feasible and should not pose any financial detriment to the manufacturers.

It is recommended that the recess 110 of each respective one of the plurality of rollers 60 fittingly surround the pyramidal configuration 100 of the hat mold surface 90 in order to uniformly install the preform 20 thereon. Simply put, the recess 110 should be sized in a way that the preform 20 may be installed on the pyramidal configuration 100 in a best way possible. After the recess 110 surrounds the width 106 of the pyramidal configuration 100, the roller system 10, by using the grasping handle 50, may be moved, or rolled, in a same direction as that of the pyramidal length 102. As the at least one of the plurality of rollers 60 of the roller system 10 moves, the respective circular roller body 62 further simultaneously engage the side portions 22 of the preform 20 to apply pressure thereon. Even though the roller body 62 may extend beyond the ends of the side portions 22, the roller body 62 should at least engage the entirety of such side portions 22 so that the pressure may be applied simultaneously and uniformly throughout. Simply put, the at least one of the plurality of rollers 60 may be repeatedly directed in the same axis as that of the length 102 of the pyramidal configuration 100 until the desired level of installation of the preform 20 onto the hat mold surface 90 is achieved.

The roller system 10 and the utilization thereof as described herein may yield advantages to efficiently enhance the production of the composite parts. For example, utilization of the roller system 10 may significantly improve the process time of installing the preform 20 upon the hat mold surface 90, such as being in the range of seven to fourteen minutes for each lay up. Such efficiency in time may result in over 50% productivity improvement and create thickness capability, Cp of 4.3, Cpk of 2.3–3.2. Moreover, the present invention may yield production implementations of 0.7 inch height rollers and design and implementation of 1 inch, 1.75 inch hats. The estimated work expended may range to about 1300 ft lbs., an improvement from the conventional arts which expends almost three times the energy than the present invention. Therefore, not only is the present invention an unique way of installing the preform 20 upon the hat mold surface 90, but it produces advantages therefrom.

Furthermore, after the preform 20 is laid to the hat mold surface 90, the manufacturers may selectively apply at least one ply 120 on the preform 20. The at least one ply 120 may be receivable of the pressure generated by the roller system 10 as described above. However, it should be recognized that not all the preforms 20 must be applied with the at least one ply 120. Specifically, complex peripheral geometry of the preform 20 may require the at least one ply 120. The at least one ply 120 may be applied on the preform 20 in any manner. However, it is preferred that none of the at least one ply 120 extends beyond the preform 20.

More specifically, the manufacturers may first cut the at least one ply 120 such that none of the at least one ply 120 extends beyond the peripheral edges of the preform 20. The at least one ply 120 may be cut according to the debulk factor, in which the at least one ply 120 may conform to the peripheral geometry of the preform 20. In other words, the at least one ply 120 are cut according to the specified thickness, width, and length as desired by the manufacturers such that their application would be optimal when applied to the preform 20. Furthermore, the at least one ply 120 may be cut individually such that they may be stacked together to provide desired thickness on the preform 20. However, the at least one ply 120 at the bottom of the stack has the largest dimension which substantially equals the dimension of composite part after cure.

Moreover, it may be important to note that several steps may be taken before laying-up the preform 20 onto the hat mold surface 90. The users may apply tapes 130, such as TEFLON tapes, around entire periphery of the excess trims 96. In addition, the hat mold surface 90 may further be heated in an oven. More specifically, the hat mold surface 90 may be heated in the oven for about 40 minutes at a temperature of about 150 degrees Fahrenheit. It is advised that the start and finish time of the heating be recorded.

There may be a dam 140 placed on each of the excess trims 96 adjacent to each of the mold lines 94. The dam 140 may be positioned in place by double sided adhesives. The dam 140 may be fabricated from any material, but a butyl rubber dam may be preferred.

Figure 7:
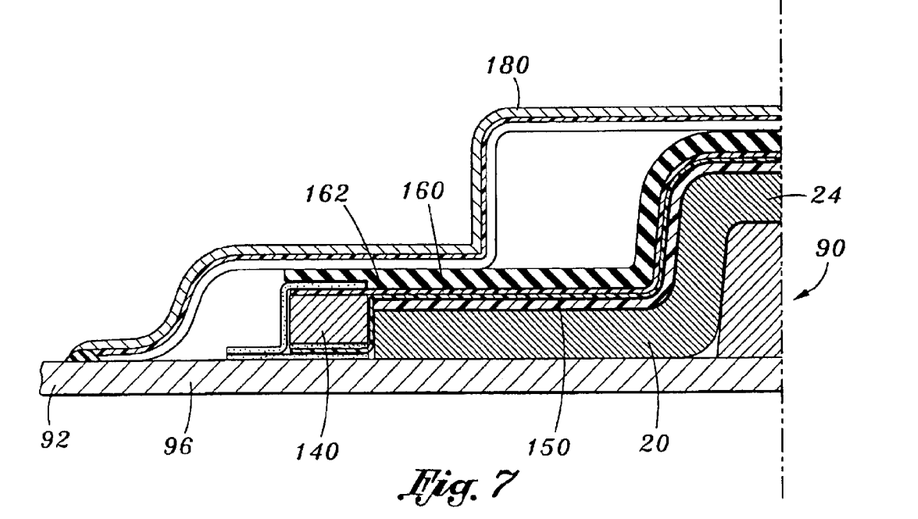
FIG. 7 is a partial cross-sectional view of the hat mold surface with the preform laid thereupon when the preform is ready to be cured.

Moreover, a peel ply 150 may be laid over the preform 20, wherein the peel ply 150 may be extendable up to the ends of the preform 20. Furthermore, a first film 160 and a second film 162 may be laid over the peel ply 150. The first and second films 160, 162 may extend up to the excess trims 96, wherein the dam 140 is positioned therebetween on each of the excess trims 96. The first and second films 160, 162 may be receivable of the pressure by the roller system 10 as disclosed above. Additionally, the first and second films 160, 162 may be any types of films, but A5000 plastic films may be preferred.

In addition to the above, at least one fillet 170 may be laid over the first and second films 160, 162. More specifically, the present method of removing air from the at least one fillet 170 is by placement on a shop aid under a flexible covering 180. The at least one fillet 170 may then be placed thereon and hand applied to locate the at least one fillet 170. However, with the utilization of the roller system 10 as disclosed above, the at least one fillet 170 may be placed thereon and compacted as the at least one of the plurality of rollers 60 moves therealong.

The users may further bag the preform 20 and the hat mold surface 90. More specifically, the users may place a flexible covering 180 over the preform 20 and the hat mold surface 90. The flexible covering 180 may be conjointly sealed at the ends of the excess trims 96 to prevent any resin leakage. The flexible covering 180 may be any type of covering. However, a vacuum bag having a vacuum attachment is preferred. Thereafter, the set-up as described above may be cured to form composite parts.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A variable pressure roller system for installing a preform having contact surfaces onto a configuration of a mold surface by applying pressure thereon, the roller system comprising:
   a) a roller carriage;
   b) a grasping handle mounted to the roller carriage; and
   c) a plurality of rollers, each respective one of the plurality of rollers being removably engageable to the roller carriage to allow a selected roller(s) to be engaged to the roller carriage, each respective one of the plurality of rollers defined by a different weight, each respective one of the plurality of rollers having a continuous circular roller body corresponding to the configuration of the mold surface to generate a specific pressure that is uniformly distributed on the contact surface, independent of a user applied force, when the selected roller(s) engaged to the roller carriage is/are rolled on the contact surface, to conform the preform to the configuration of the mold surface, and to allow installation of the preform on different mold surface configurations.

2. The roller system of claim 1 wherein the roller carriage is fabricated from a metallic material.

3. The roller system of claim 1 wherein the roller carriage has a first surface and the grasping handle is mounted thereon.

4. The roller system of claim 1 wherein the roller carriage has a second surface and each respective one of the plurality of rollers is rotatably engageable thereto.

5. The roller system of claim 4 wherein the second surface further comprises at least one paired flanges having a respective opening opposed to each other and extending downward in generally perpendicular relationship to the second surface, each respective one of the plurality of rollers being positionable between the at least one paired flanges to engage thereto.

6. The roller system of claim 5 further comprising an elongated shaft and wherein each respective one of the plurality of rollers has an aperture extending therethrough, the shaft being sequentially advanceable through one opening of the at least one paired flanges, the aperture, and other opening of the at least one paired flanges to simultaneously extend thereacross.

7. The roller system of claim 6 wherein the elongated shaft has shaft ends, the shaft being securable in position after extending across the one opening, the aperture, and the other opening via a fastener applied to the shaft ends thereof.

8. The roller system of claim 1 wherein the plurality of rollers are fabricated from a metallic material.

9. The roller system of claim 1 wherein the plurality of rollers are similarly sized.

10. The roller system of claim 9 wherein at least one of the plurality of rollers is fabricated from aluminum.

11. The roller system of claim 9 wherein at least one of the plurality of rollers is fabricated from steel.

12. The roller-system of claim 9 wherein the plurality of rollers comprise a first roller and a second roller each defining a continuous circular roller body having a diameter corresponding thereto, the size of the roller body and the diameter corresponding thereto of the first roller being substantially larger than the size of the roller body and the diameter corresponding thereto of the second roller.

13. The roller system of claim 12 wherein the first roller and the second roller are simultaneously engageable to the roller carriage.

14. The roller system of claim 1 wherein each respective one of the plurality of rollers comprises a continuous circular roller body having a recess circumventing intermediate area thereof, the recess being defined by a recess width and a recess depth.

15. The roller system, of claim 14 wherein the mold surface is a hat mold surface with a pyramidal configuration thereon, the pyramidal configuration being defined by a pyramidal width, a pyramidal height and a pyramidal length.

16. The roller system of claim 15 wherein the recess is positionable over the pyramidal configuration to allow each respective one of the plurality of rollers to move along the pyramidal length, the recess depth being sufficient to receive the pyramidal height, the recess width being sufficient to accommodate the pyramidal width.

17. The roller system of claim 16 wherein the recess depth substantially corresponds to the pyramidal height.

18. The roller system of claim 16 wherein the recess width substantially aligns with the pyramidal width.

19. The roller system of claim 16 wherein the contact surfaces are side portions of the preform, the preform further having a centerline with a centerline width disposed between the side portions, the centerline being superimposeable upon the pyramidal configuration such that the centerline width substantially aligns with the pyramidal width and further substantially aligning with the recess width when at least one of the plurality of rollers moves along the pyramidal length.

20. The roller system of claim 19 wherein each of the side portions has a respective side width, the roller body being sized to engage the side width of each of the side portions to uniformly distribute the pressure thereon when the at least one of the plurality of rollers moves along the pyramidal length.

21. The roller system of claim 20 wherein an entirety of the respective side width is engageable by the roller body.

22. The roller system of claim 1 further comprising at least one ply, the at least one ply being superimposeable upon the preform, the at least one ply further being receivable of the pressure when the at least one of the plurality of rollers moves thereon.

23. The roller system of claim 1 further comprising a peel ply, the peel ply being superimposeable upon the preform.

24. The roller system of claim 23 further comprising at least one film, the at least one film being superimposeable upon the peel ply, the at least one film further being receivable of the pressure when the at least one of the plurality of rollers moves thereon.

25. The roller system of claim 24 further comprising at least one fillet, the at least one fillet being superimposeable upon the at least one film, the at least one fillet further being receivable of the pressure when the at least one of the plurality of rollers moves thereon.

26. The roller system of claim 1 wherein the roller body is defined by two downwardly slanted sides intersecting with a plane top thereon formed all around an intermediate area of the roller body for providing uniform multi-directional pressure to the mold surface.

27. A method of installing a preform onto a configuration of a mold surface by applying pressure thereon via a roller carriage having at least one roller selected from a plurality of rollers engaged thereto, the method comprising the steps of:
- a) laying the preform having contact surfaces onto the configuration of the mold surface;
- b) selecting at least one roller from the plurality of rollers, each respective one of the plurality of rollers being defined by a roller weight to generate a specific pressure corresponding thereto, each respective one of the plurality of rollers having a continuous circular roller body for uniformly distributing the specific pressure on the contact surfaces;
- c) attaching the selected roller(s) to the roller carriage; and
- d) distributing the specific pressure generated by the roller weight of the selected roller(s) uniformly to the contact surfaces for conforming the preform to the configuration of the mold surface.

28. The method of claim 27 wherein the roller carriage has a first surface with a grasping handle mounted thereon.

29. The method of claim 27 wherein the roller carriage further has a second surface, the second surface having at least one paired flanges with a respective opening opposed to each other and extending downward in generally perpendicular relationship to the second surface, the at least one roller being positionable between the at least one paired flanges to engage thereto.

30. The method of claim 29 wherein the roller carriage further comprises an elongated shaft and the at least one roller has an aperture extending therethrough, the shaft being sequentially advanceable through one opening of the at least one paired flanges, the aperture, and other opening of the at least one paired flanges to simultaneously extend thereacross.

31. The method of claim 27 wherein the at least one roller is fabricated from aluminum.

32. The method of claim 27 wherein the at least one roller is fabricated from steel.

33. The method of claim 27 wherein the at least one roller comprises a continuous circular roller body having a recess circumventing intermediate area thereof, the recess being defined by a recess width and a recess depth.

34. The method of claim 33 wherein the mold surface is a hat mold surface with a pyramidal configuration thereon, the pyramidal configuration being defined by a pyramidal width, a pyramidal height and a pyramidal length.

35. The method of claim 34 wherein the recess is positionable over the pyramidal configuration to allow the at least one roller to move along the pyramidal length, the recess depth being sufficient to receive the pyramidal height, the recess width being sufficient to accommodate the pyramidal width.

36. The method of claim 35 wherein the contact surfaces are side portions of the preform, the preform further having a centerline with a centerline width disposed between the side portions, the centerline being superimposeable upon the pyramidal configuration such that the centerline width substantially aligns with the pyramidal width and further substantially aligning with the recess width when the at least one roller moves along the pyramidal length.

37. The method of claim 36 wherein each of the side portions has a respective side width, the roller body being sized to engage the side width of each of the side portions to uniformly distribute the pressure thereon when the at least one roller moves along the pyramidal length.

38. The method of claim 27 wherein subsequent to step a) the method further comprises the step of applying at least one ply on the preform.

39. The method of claim 27 wherein subsequent to step a) the method further comprises the step of laying a peel ply over the preform.

40. The method of claim 39 further comprising the step of laying at least one film over the peel ply.

41. The method of claim 40 further comprising the step of laying at least one fillet over the at least one film.

42. The method of claim 27 wherein step d) comprises the step of repeatedly moving the at least one roller on the preform until the installation of the preform onto the mold surface is achieved.

* * * * *